United States Patent [19]

Shinya

[11] Patent Number: 5,548,693
[45] Date of Patent: Aug. 20, 1996

[54] ANTI-ALIASING METHOD FOR ANIMATION

[75] Inventor: Mikio Shinya, Matsudo, Japan

[73] Assignee: Nippon Telegraph and Telephone Corporation, Tokyo, Japan

[21] Appl. No.: 221,563

[22] Filed: Apr. 1, 1994

[30] Foreign Application Priority Data

Apr. 5, 1993 [JP] Japan .................................. 5-078070

[51] Int. Cl.$^6$ ............................................ G06T 13/00
[52] U.S. Cl. ............................... 395/152; 395/127
[58] Field of Search ........................... 395/118, 125–129, 395/131–132, 133, 137–138, 152; 345/121–122; 348/135, 140, 121, 25

[56] References Cited

U.S. PATENT DOCUMENTS

| | | | |
|---|---|---|---|
| 5,025,394 | 6/1991 | Parke | 395/152 |
| 5,325,472 | 6/1994 | Horiuchi et al. | 395/127 |
| 5,428,399 | 6/1995 | Robinson et al. | 348/459 |

OTHER PUBLICATIONS

Kim et al, "Lowpass Temporal Filter Using Motion Adaptive Spatial Filtering and its Systolic Realization", *IEEE Transactions on Consumer Electronics*, vol. 38, No. 3, Aug. 1992, pp. 452–459.

Woo et al, "A Survey of Shadow Algorithms", *IEEE Computer Graphics and Applications*, vol. 10, No. 6, Nov. 1990, pp. 13–32.

Korein, J., and Badler, N., "Temporal Anti–Aliasing in Computer Generated Animation," *Computer Graphics*, vol. 17, No. 3, Jul. 1993, pp. 377–388.

*Primary Examiner*—Mark K. Zimmerman
*Assistant Examiner*—Joseph H. Feild
*Attorney, Agent, or Firm*—Pollock, Vande Sande & Priddy

[57] ABSTRACT

Data containing the shape and motion of an object, the eye point and similar data is input to generate animation image data. For all frames, the motion of each image point is computed through utilization of data on the motion of the object and eye point used for producing the animation and, on the basis of the computed motion of the image point, spatio-temporal filtering is performed for anti-aliasing.

11 Claims, 12 Drawing Sheets

ANTI-ALIASING METHOD FOR ANIMATION

BACKGROUND OF THE INVENTION

The present invention relates generally to the field of computer graphics and, more particularly, to an anti-aliasing method for animations created or synthesized on a computer.

In synthesizing images by computers through sampling, what is called aliasing occurs. Aliasing artifacts have been troublesome in the field of graphics for a long time. These problems are particularly bad in animation sequences, since flickering thin objects and traveling jaggies are very noticeable. Conventionally, a super-sampling method is most widely used to remove aliasing of this kind (see, for example, J. Foley, et al, "Computer Graphics-Principles and Practice-," Addition—Wesley Publishing Company, 1989—hereinafter referred to as Literature 1). The super-sampling method reduces aliasing by sampling the image two or more times per pixel. To enhance the anti-aliasing effect, the super-sampling method may sometimes be used in combination with a stochastic sampling method as described in Literature 1, for example. This method slightly shifts the positions of sample points from their regular positions through use of a random number or the like, and hence permits reduction of moiré-like aliasing which is caused by sampling the image at regular positions.

The above-mentioned anti-aliasing methods enhance the effect with an increase in the number of samples per pixel but pose a problem in terms of the speeding up of operation since the computational complexity and consequently the computing time also increases in proportion to the number of samples.

SUMMARY OF THE INVENTION

It is therefore an object of the present invention to provide a method with which it is possible to produce the same anti-aliasing effect as that by the super-sampling method at high speed, without increasing the number of samples per pixel, for animations that are created or synthesized by computers.

According to the present invention, information about the motion of objects and the eye point during the creation of an animation is used to compute the motion of each image point on the image plane at a point on each object, and spatio-temporal filtering is effected based on the thus computed motion of the image point. In the synthesis of an animation image by sampling, the spatio-temporal filtering may also be performed for an animation produced by slightly shifting the positions of sample points in each frame of the animation.

As mentioned above, according to the present invention, data on the motion of objects and the eye point used during the production of the animation are used to compute the motion of each image point on the image plane at each point on the objects, and spatio-temporal filtering is carried out based on the computed motion of the objects—this is seemingly equivalent to the method which shifts the positions of sample points and increases the number of samples per pixel. Hence, the present invention permits high-speed implementation of the same anti-aliasing effect as is obtainable with the super-sampling method. Moreover, by performing the spatio-temporal filtering for an animation produced by slightly shifting the positions of sample points in each frame of the animation as referred to above, it is also possible to realize the anti-aliasing for an object which stands still with respect to the screen coordinate system.

DESCRIPTION OF THE PREFERRED EMBODIMENT

A description will be given first of the principles of the present invention which are applied to its embodiments described later on.

<Fourier Analysis>

Temporal variation in animation sequences is usually due to the motion of the camera and objects. Here, the spatio-temporal spectra of image sequences of moving objects is mathematically analyzed. The velocity on the image plane is first assumed to be constant in time and space, and then, analyses with spatial and temporal variation follow. The analyses provide an ideal anti-aliasing filter with infinite integral under certain conditions. Throughout this section, a one-dimensional space (image) is assumed for simplicity, but extension to two-dimensional images is mathematically straightforward.

<Preparation>

Let x be the image coordinate in pixels and t be the time in frames. Let a real function $f_0(x)$ be the image at $t=t_0$, and $f(x;t)$ be the image sequence. The spatial Fourier transform of f is defined by $$F_0(\xi)=\int f_0(x)\exp(i\xi x)dx,$$

$$F(\xi;t)=\int f(x;t)\exp(i\xi x)dx,$$

where $\xi$ denotes the spatial angular frequency (rad/pixel), and i is the imaginary unit, $i^2=-1$. Similarly, the spatio-temporal Fourier transform is defined by $$F(\xi;\omega)=\int F(\xi;t)\exp(i\omega t)dx,$$

where $\omega$ is the temporal angular frequency in rad/frame.

The sampled image sequence $f_s(x,t)$ is represented by $$f_s(x,t) = f(x,t) \sum_{p,r} \delta(x - 2\pi p/\Xi)\delta(t - 2\pi r/\Omega),$$

where $\Xi$ and $\Omega$ are the sampling frequencies in space and time and p and r are integers. When one point per pixel per frame is sampled, $\Xi=2\pi$ and $\Omega=2\pi$. The Fourier transform of $f_s$ is $$F_s(\xi;\omega) = \sum_{m,l} F_{m,l}(\xi,\omega), \quad (1)$$

where m and l are integers and $$F_{m,l}(\xi,\omega)=F(\xi+m\Xi, \omega+l\Omega).$$

Figure 1:
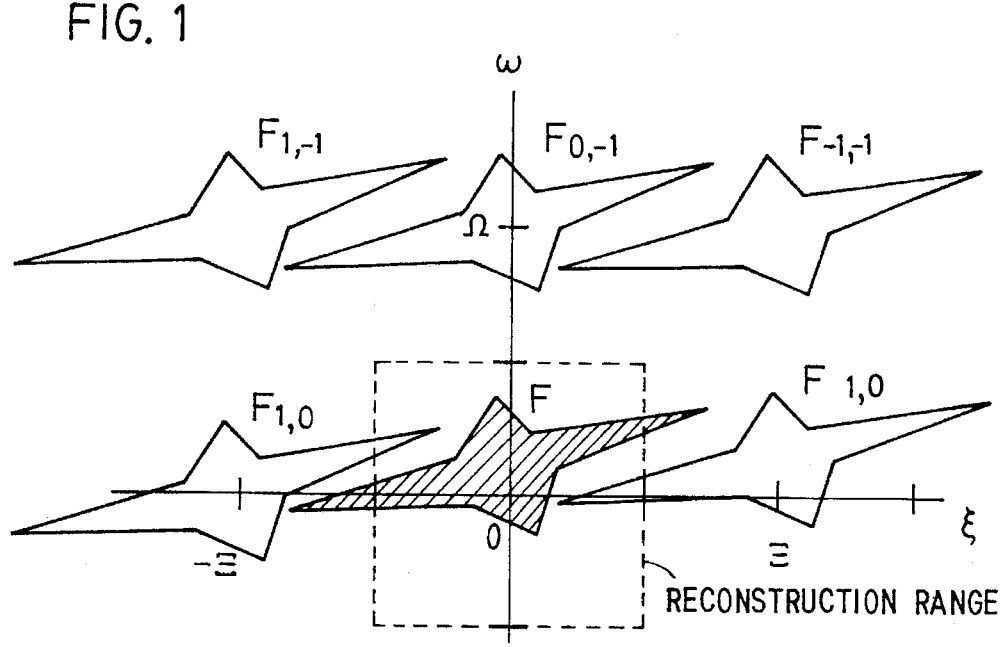
FIG. 1 is a schematic diagram showing an example of aliasing in the Fourier space.

Equation (1) indicates that replicas of F appear, centered at the grid points $(-m\Xi, -l\Omega)$, as illustrated in FIG. 1.

When $F(\xi,\omega)\neq 0$ outside the Nyquist frequencies $(\pm\Xi/2, \pm\Omega/2)$, some replicas intrude on the reconstruction range, causing aliasing artifacts. In other words, anti-aliasing can be achieved if replicas $F_{m,l}$ can be filtered out. Therefore, anti-aliasing can be regarded as a process which calculates filtered images from the sampled images, and consequently, the objective is to find some mapping $$f_s \to \int f_0(x)w(x_0-x)dx$$

for any $x_0$. Here, $w(x)$ denotes some desirable spatial anti-aliasing filter.

The notation defined here is listed below.

| | |
|---|---|
| x | position on the image (pixel) |
| t | time (frame) |
| $\xi$ | spatial angular frequency (rad/pixel) |
| $\omega$ | temporal angular frequency (rad/frame) |
| $f_0(x)$ | image at $t = t_0$ |
| $f(x;t)$ | image at t |
| $f_s(x;t)$ | sampled image sequence |
| $F_0(\xi)$ | the spatial spectrum of $f_0$ |
| $F(\xi,\omega)$ | the spatio-temporal spectrum of f, |
| $F_s(\xi,\omega)$ | the spatio-temporal spectrum of $f_s$, |
| $\Xi$ | spatial sampling frequency |
| $\Omega$ | temporal sampling frequency |
| $F_{m,l}$ | the replica of F centered at $(-m\Xi, -l\Omega)$ |
| $w(x)$ | spatial anti-aliasing filter |
| $g(x,t)$ | shift variant spatio-temporal filter |
| $G(\xi,\omega)$ | the spatio-temporal spectrum of g. |

<Constant Velocity Motion>

First, the simplest motion, constant velocity motion will be considered. In this case, the image at t can be represented by $$f(x;t)=f_0(x+v_0(t_0-t)) \quad (2)$$

where $v_0$ is the velocity of the pattern. Its spatio-temporal spectrum is $$\begin{aligned}F(\xi,\omega) &= \int \exp(i\omega t)dt \int f_0(x + v_0(t_0 - t))\exp(i\xi x)dx \quad (3)\\ &= \int F_0(\xi)\exp(i\xi v_0(t - t_0))\exp(i\omega t)dt \\ &= 2\pi F_0(\xi)\exp(-i\xi v_0 t_0)\delta(v_0\xi + \omega)\end{aligned}$$

where $\delta$ is Dirac's delta function and the following equality $$\int \exp(iuv)dv=2\pi\delta(u)$$

was used.

Figure 2:
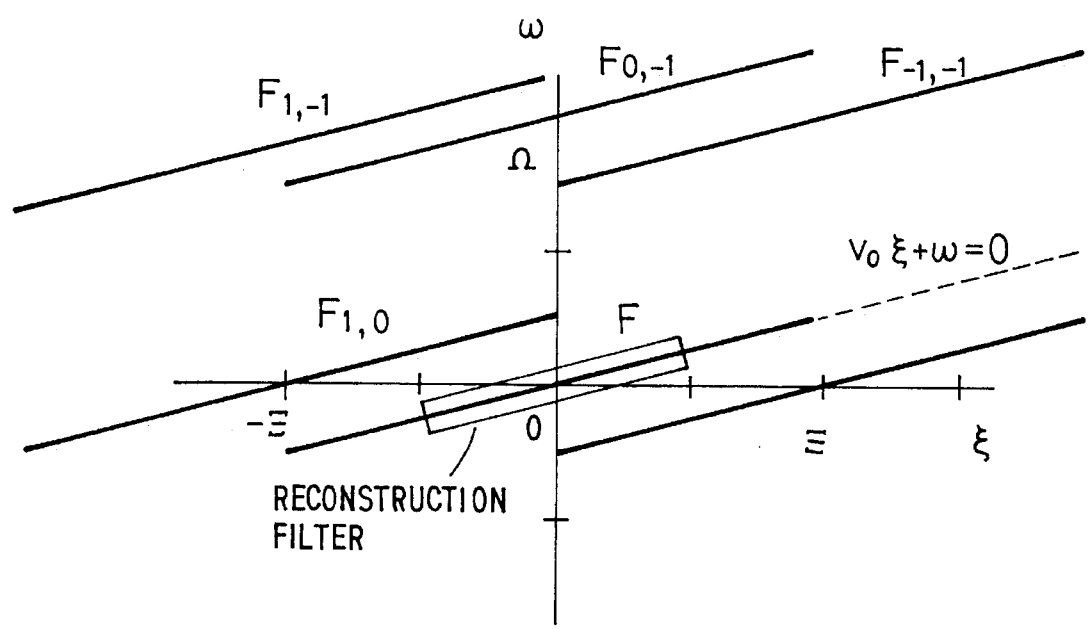
FIG. 2 is a diagram showing the spatio-temporal spectrum of an image moving at a constant speed.

Equation (3) clarifies a very important fact: the spectrum F can be separated from the replicas even though the spatial spectrum $F_0(\xi)$ ranges beyond the Nyquist frequency. FIG. 2 illustrates this situation. The replicas can be filtered out as shown in the figure if velocity $v_0$ is known. Fortunately, the velocity can be easily calculated from animation data in graphics applications. Thus, an ideal anti-aliasing filter in this case looks like $$G_v(\xi,\omega)=2\pi\delta(v_0\xi+\omega). \quad (4)$$

The linear filtering in the Fourier domain $G_v F_s$ is equivalent to convolution in real time-space, that is, $$\iint f_s(x,t)\delta((x_0-x)-(t_0-t)v_0)dxdt. \quad (5)$$

<General Motion>

Now, general motion will be considered. When the image point $x_0$ at $t_0$ moves to $x_1$ at $t_1$, the motion is denoted by $$x_1=s(t_1;x_0,t_0). \quad (6)$$

For example, the flow $s_v$ of the same image point for constant motion is:

$$s_v(t;x_0,t_0)=x_0+v(t-t_0).$$

Note that the reciprocity generally holds from the definition $$x=s(t;s(t_0;x_0,t),t_0).$$

To avoid convergence problems, a finite animation sequence should be considered. With the flow s, the sequence can be described as:

$$\begin{aligned}f(x,t) &= f_0(s(t;x,t)) \text{ if } t\in[-T/2, T/2] \quad (7)\\ &= 0 \text{ otherwise},\end{aligned}$$

where T is the length of the animation. The sampled image sequences are represented by $$\begin{aligned}f_s(x,t) &= f(x,t) \sum_{p,r} \delta(x - 2\pi p/\Xi)\delta(t - 2\pi r/\Omega),\\ F_s(\xi,\omega) &= \sum_{m,l} \int_{-T/2}^{T/2} dt \int_{-\infty}^{\infty} f_0(s(t_0;x,t))\\ &\quad \exp[i(\xi + m\Xi)x + i(\omega + l\Omega)t]dx\\ &= \sum_{m,l} F_{m,l}\end{aligned}$$

Next, the anti-aliasing filter will be considered. Filtering for constant motion, Eq. (5), can be rewritten as $$\iint f_s(x,t)\delta(x_0-s_v(t_0;x,t))dxdt.$$

By analogy, a filter kernel g is set as $$\begin{aligned}g(x,t;x_0,t_0) &= (1/T)w(x_0 - s(t_0;x,t)) (\partial s/\partial x)_{t_0,t} \quad (8)\\ &= (1/T)w(x_0 - s(t_0;x,t))D_s(t_0;x,t)\end{aligned}$$

for space-variant filtering at $(x_0,t_0)$:

$$h(x_0,t_0)=\iint f_s(x,t)g(x,t)dxdt. \quad (9)$$

Here, $w(x)$ represents some appropriate anti-aliasing filter, such as a sinc-function, Gauss function, box function, and so on. The factor $1/T$ is the normalization constant, and $D_s=(\partial s/\partial x)$ compensates for image magnification variation due to spatially non-uniform motion.

Now, it will be proved that the filtering defined by Eq. (9) becomes an ideal anti-aliasing filter in the limit that $T \to \infty$. From the Parseval Identity, Eq. (9) can be rewritten as $$\begin{aligned} h(x_0,t_0) &= (1/2\pi)^2 \iint F_s(\xi,\omega) G^*(\xi,\omega) d\xi d\omega \\ &= (1/2\pi)^2 \sum_{m,l} \iint F_{m,l}(\xi,\omega) G^*(\xi,\omega) d\xi d\omega \\ &= \sum_{m,l} h_{m,l}, \end{aligned}$$

where $G^*$ denotes the complex conjugate of $G$. The function $G$ is the spatio-temporal spectrum of $g$, calculated by $$\begin{aligned} G(\xi,\omega) &= (1/T) \iint w(x_0 - s(t_0;x,t))(\partial s/\partial x) \\ &\quad \exp[i(\xi x + \omega t)] dt dx \\ &= (1/T) \iint w(x_0 - u) \exp[is(t;u,t_0)\xi] \exp(i\omega t) du dt, \end{aligned}$$

where $u = s(t_0;x,t)$. Then, the integral $h_{m,l}$ can be evaluated as $$\begin{aligned} h_{m,l} &= 1/(2\pi)^2 (1/T) \int_{-T/2}^{T/2} \exp[i(\omega + l\Omega)t_1] dt_1 \\ &\quad \int f_0(s(t_0; x_1, t_1)) \exp[i(\xi + m\Xi)x_1] dx_1 \\ &\quad \iint w(x_0 - u) \exp[-is(t_2;u, t_0)\xi] \\ &\quad \exp(-i\omega t_2) \, du dt_2 \int d\xi \int d\omega \\ &= (1/T) \int_{-T/2}^{T/2} \exp(il\Omega t_1) dt_1 \\ &\quad \int f_0(s(t_0; x_1, t_1)) \exp(im\Xi x_1) dx_1 \\ &\quad \iint w(x_0 - u) \delta(t - t_1) \delta(x - s(t_2;u, t_0)) du dt \\ &= \int w(x_0 - u) f_0(u) du \\ &\quad \int_{-T/2}^{T/2} \exp[im\Xi s(t_1;u, t_0)] \exp(il\Omega t_1) dt_1/T, \end{aligned}$$ (10)

where the reciprocity $s(t_0; s(t_1;u,t_0), t_1) = u$ was used. Consequently, $$\lim_{T \to \infty} h_{m,l} = \int w(x_0 - u) f_0(u) du \left[ \lim_{T \to \infty} K_m(l\Omega;u)/T \right],$$

where $K_m(\omega;u)$ is the Fourier transform of the function $k_m$ $$k_m(t;u) = \exp[im\Xi s(t;u,t_0)].$$

Obviously, $$h_{o,o} = \int w(x_0 - u) f_0(u) du.$$

On the other hand, when $K_m$ is not singular at $\omega = l\Omega$, the aliasing pattern tends to 0, as $$\lim_{T \to \infty} h_{m,l} = 0.$$

This completes the proof.

Note that $K_m(l\Omega,u)$ can be singular when, for example, motion is periodic with a frequency of $(l\Omega/m)$, or constant motion with a velocity of $(l\Omega/m\Xi)$.

<Discrete Filtering>

The filtering Eq. (9) can also be represented in a discrete form. By setting $\Xi = 2\pi$ and $\Omega = 2\pi$ (1 sample/pixel/frame sampling), the following equations $$h(x_0, t_0) = \iint f_s(x;t) g(x,t) dx dt \quad (11)$$

$$= (1/T) \int_{-T/2}^{T/2} dt \int_{-X/2}^{X/2} f(x;t) g(x,t) \sum_{p,r} \delta(x-p) \delta(t-r) dt dx$$

$$= (1/T) \sum_{p=-X/2}^{X/2} \sum_{r=-T/2}^{T/2} f(p;r) w(x_0 - s(t_0;p,r)) D_s(t_0;p,r)$$

are obtainable for T-frame image sequences at the X pixel image resolution. Since Eq. (11) is a finite weighted sum of the sampled images, it can be directly computed.

The magnification factor $D_s = (\partial s/\partial x)$ compensates for image distortion due to non-uniformity of motion flow. For spatially uniform motion (more generally, incompressible flow), $D_s \equiv 1$. Furthermore, since $D_s(t_0;t,x) \to 1$ as $t \to t_0$, it can be assumed that $D_s = 1$, when the filter size T is small. If non-uniformity is not negligible, it is necessary to evaluate $D_s$ point by point.

For practical implementation, the filtering equation Eq. (11) is slightly modified. By assuming local uniformity of motion flows, the next equation $$h(x_0, t_0) = (1/T) \sum_{p,r} f(p;r) w(s(r; x_0, t_0) - p) \quad (12)$$

is obtained where the uniformity $x - y = s(t;x,t') - s(t;y,t')$ was used. The advantage of Eq. (12) over Eq. (11) is that only one flow $s(r;x_0,t_0)$ should be traded for $(x_0,t_0)$ rather than all flows $s(t_0;p,r)$.

The normalization factor $(1/T)$ relies on $$\lim_{T \to \infty} (1/T) \sum_{r=-T/2}^{T/2} \sum_p w(s(r;x,t) - p) = 1,$$

and would cause a normalization problem for finite T. Thus, it is better to adopt explicit normalization such as $$h(x_0, t_0) = \sum_{p,r} f(p;r) w(s(r;x_0, t_0) - p) / \sum_{p,r} w(s(r;x_0, t_0) - p) \quad (13)$$

Next, a description will be given of an embodiment of the present invention.

Figure 3:
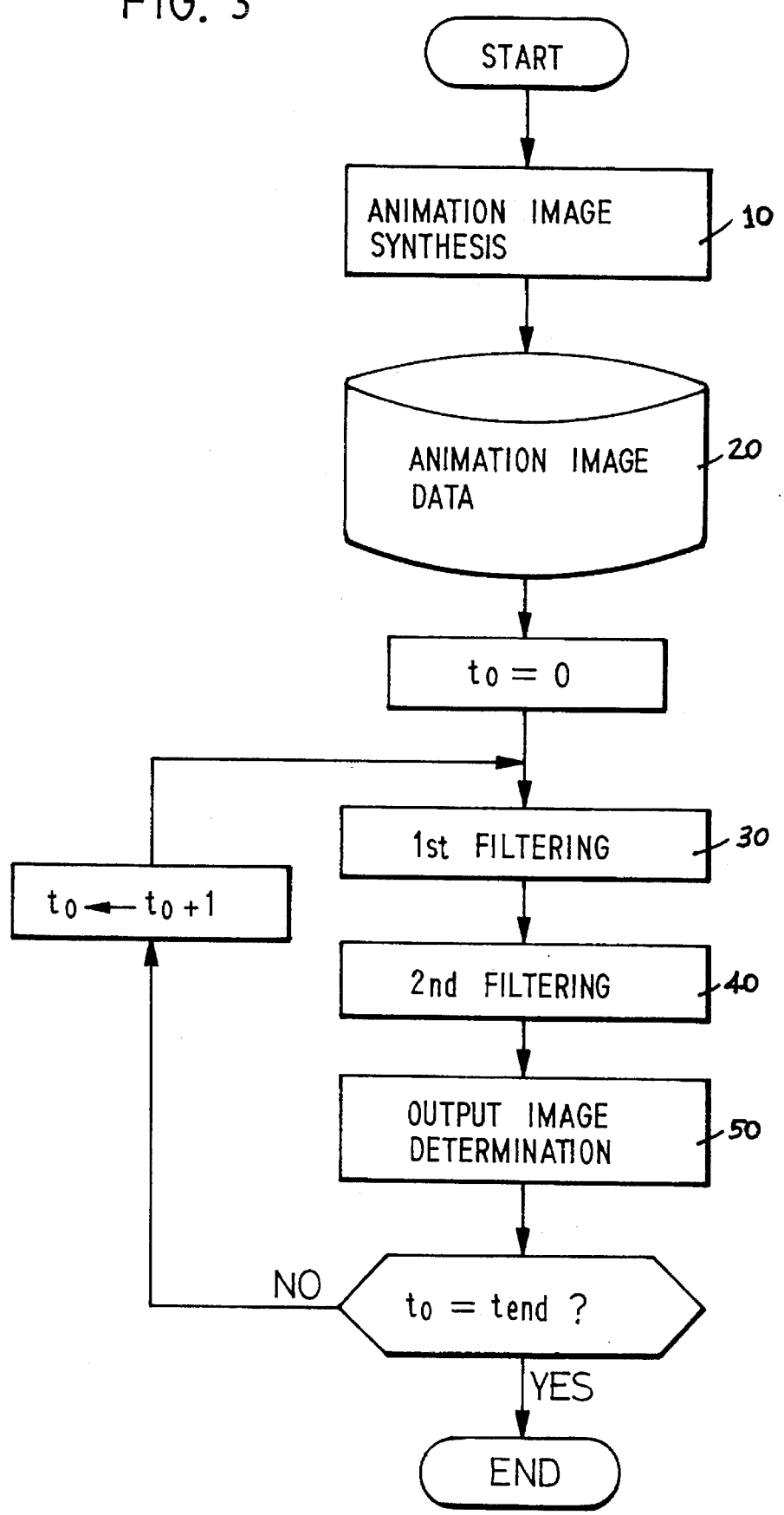
FIG. 3 is a flowchart of an embodiment of the present invention.

FIG. 3 is a flowchart of the entire process of the embodiment according to the present invention. Since an animation image consists of images of a sequence of frames, the frame numbers will hereinafter be represented by discrete time t corresponding to the frames. In FIG. 3, a variable $t_0$ is the frame number of the image being currently processed and a variable $t_{end}$ is the last frame number of the image to be processed. Each frame is formed by pixels of a number defined by predetermined resolution on a screen onto which objects and scenes are projected. In step 10 an animation image is synthesized and the synthesized animation image data 20 is output as a file formed by a sequence of frames. After this, based on the animation image data 20, steps 30 through 50 are performed for all frames $t_0 = 0$ through $t_{end}$ to thereby complete the anti-aliasing process.

In step 30 filtering is performed for image points of an object sampled in the frame image being processed (which filtering will hereinafter be referred to as the first filtering). In step 40 filtering is performed for image points of the object that could not be sampled in the frame image being processed (which filtering will hereinafter be referred to as the second filtering). In step 50 the color of the output image is determined. These steps will be each described in detail.

<Animation image synthesizing step>

Figure 4:
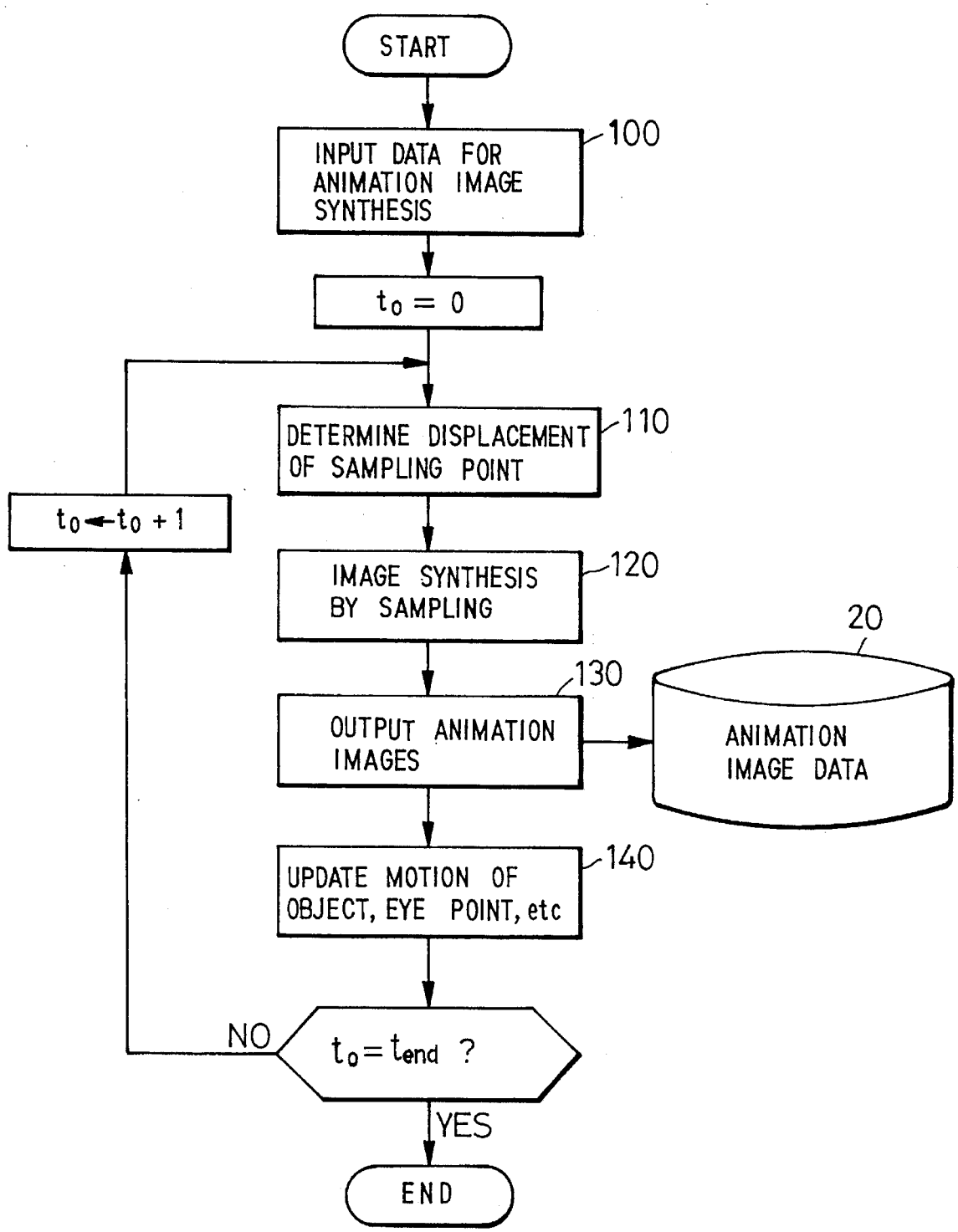
FIG. 4 is a flowchart showing in detail the animation image synthesis step in FIG. 3.

The animation image synthesizing step 10 in FIG. 3 is implemented by, for instance, a flowchart shown in FIG. 4. This example employs the aforementioned stochastic sampling method.

In FIG. 4, data for synthesizing an animation image is input in step 100. The input data contains the shape, shading parameters and motion of objects, the eye point and similar data. Thereafter, steps 110 through 140 are repeatedly performed for each frame until processing of all frames is complete.

Figure 5A:
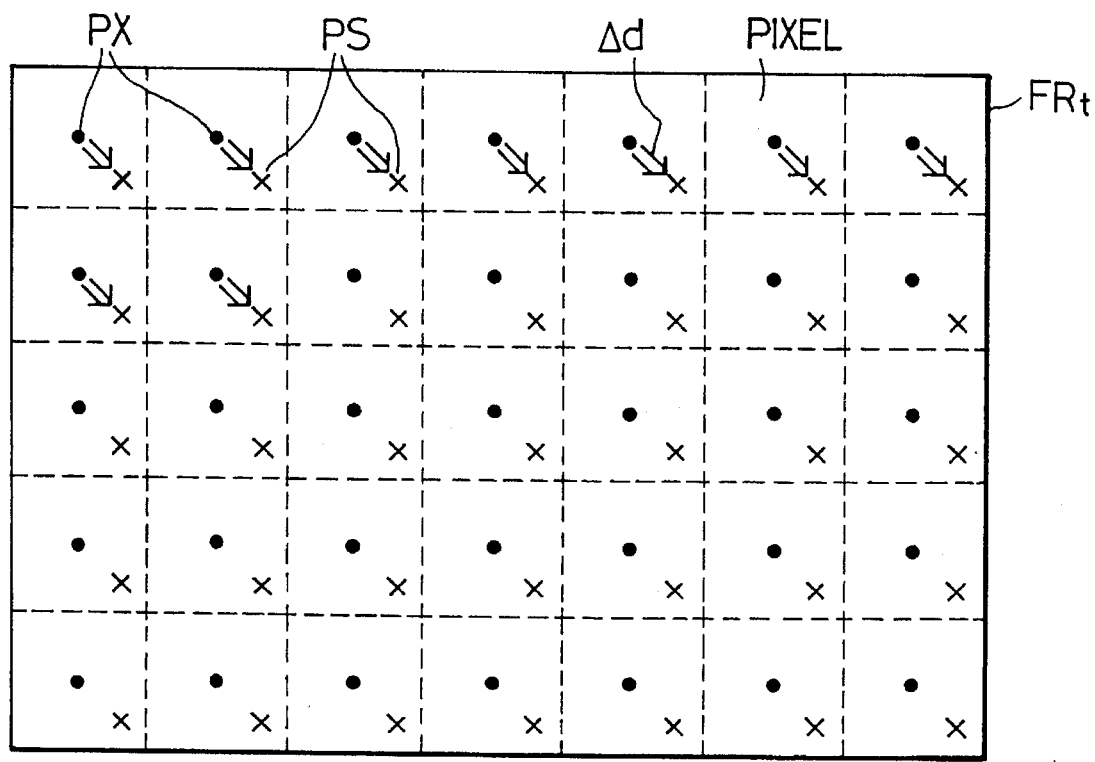
FIG. 5A is a diagram for explaining displacements of sample points in an arbitrary frame.
Figure 5B:
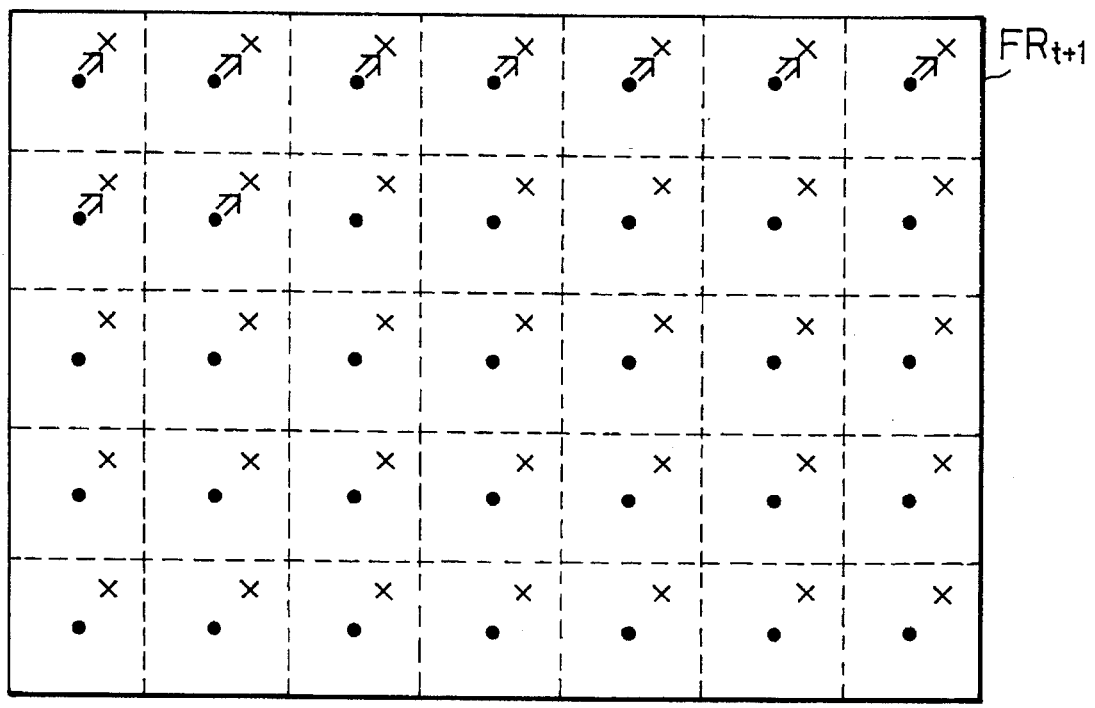
FIG. 5B is a diagram showing displacements of sample points in the frame immediately subsequent to the frame depicted in FIG. 5A.

Step 110 is the step of determining the displacement of each sample point for stochastic sampling; displacement $\Delta d=(\Delta x, \Delta y)$ of the sample point PS from the pixel center PX is determined for each frame by use of a random number or the like. Assuming that the pitch of pixels is 1, the magnitude of displacement is in the range of $|\Delta x|>0.5$ and $|\Delta y|<0.5$, for example. By this, the position of each image sampling point PS with respect to the pixel center PX differs for each frame as shown in FIGS. 5A and 5B which are diagrammatic showings of two successive frames $FR_t$ and $FR_{t+1}$. FIGS. 5A and 5B show that the positions (indicated by crosses) of the sample points PS differ for the frames $FR_t$ and $FR_{t+1}$, for instance.

Step 120 is the step of synthesizing an image through sampling; based on the displacements of the sample positions determined in step 110, the image for each frame is synthesized by a known method such as the z-buffer method or ray tracing method (Literature 1, for example).

Step 130 is the step of outputting animation image data 20 to a file or the like. The output data is composed of animation data and image data and the like obtained in step 120. The animation data is, for instance, the direction and position of each object in the scene in the frame defined on the screen, relative to the eye point. This can usually be described by a transformation matrix $T(id, t_0)$ from the object space to the image space, where id is the identification number of an object Ob and $t_0$ is the number of the frame. The matrix T includes the effect of the displacements of the sample points determined in step 110. The image data obtained in step 120 is the color RGB (ix, iy, iz) and depth value z(ix, iy, iz) for each pixel, the identification number id(ix, iy, t) of the sampled object Ob, etc.

Step 140 is a step of updating the positions and directions of the object Ob, the eye point PE and the like by use of information on motion contained in the input data in step 100.

<First Filtering>

Figure 6:
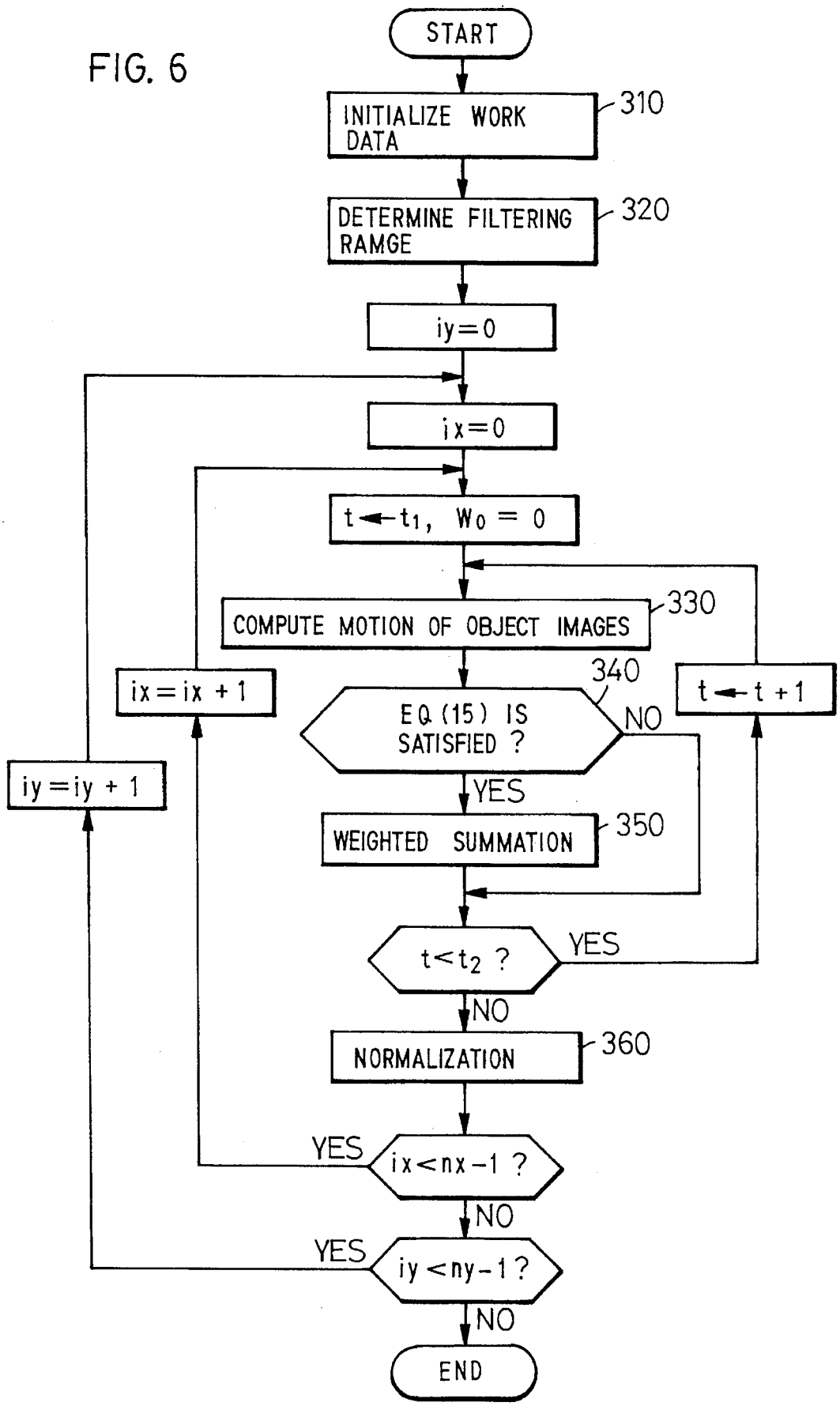
FIG. 6 is a detailed flowchart of a first filtering process in FIG. 3.

The first filtering in step 30 in FIG. 3 is to perform spatio-temporal filtering for an object sampled in the frame $t_0$ being processed; this filtering is implemented by such a flowchart as shown in FIG. 6. In FIG. 6, variables $t_1$ and $t_2$ indicate the range of the frame numbers in which to perform filtering; variables ix and iy indicate the position of each pixel; constants nx and ny indicate the pixel resolution of each image in the x- and y-directions; and a variable t indicates the frame number.

Figure 7:
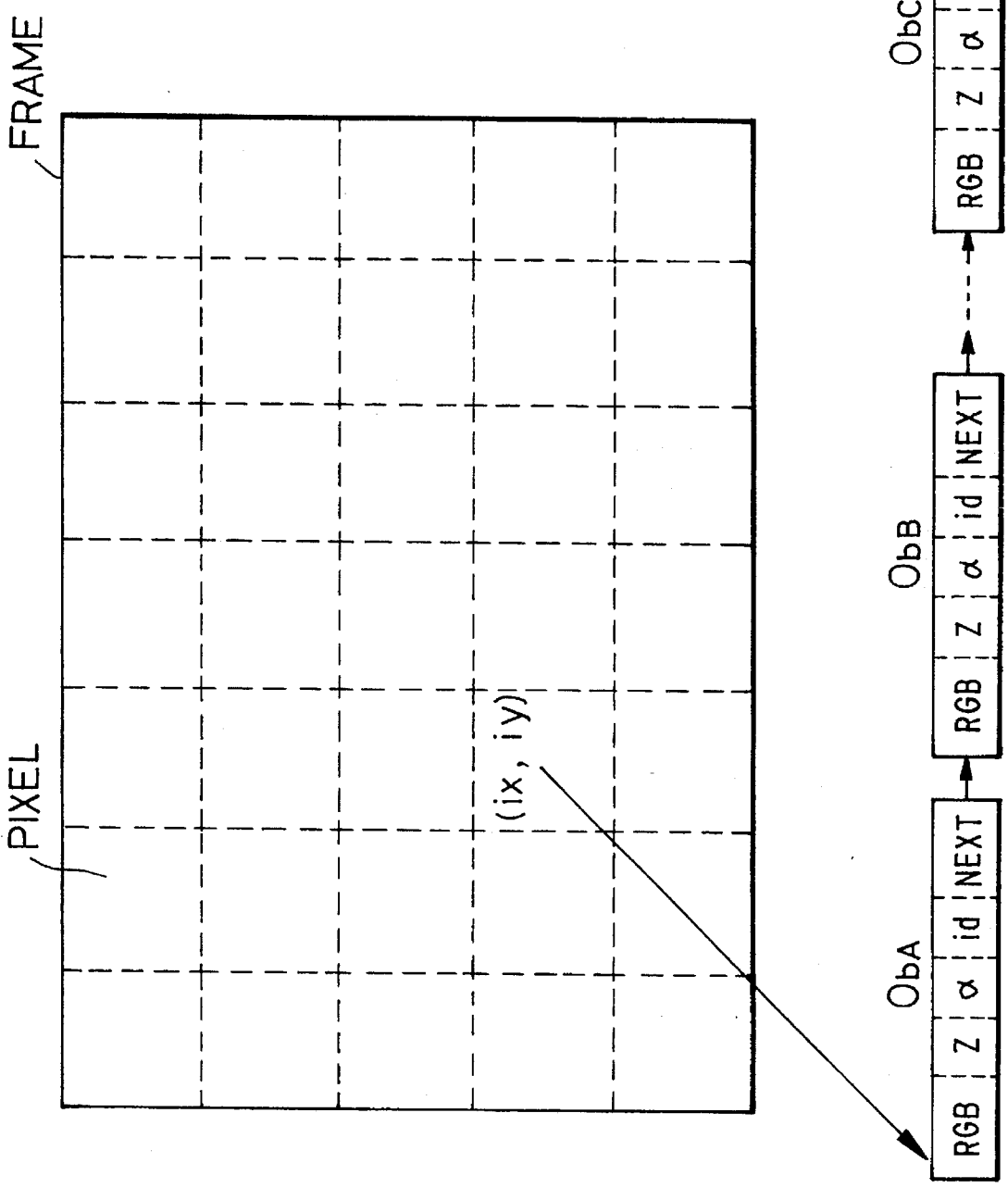
FIG. 7 is a diagram for explaining the data structure of work data.

Step 310 is the step of initializing work data. As depicted in FIG. 7, the work data is composed of color data $RGB_0(ix, iy)$, depth data $z_0(ix, iy)$ and contribution factor $\alpha(ix, iy)$ for each pixel (ix, iy) of the frame, the identification number id(ix, iy) of the object Ob which is sampled at this pixel, and a pointer NEXT(ix, iy). The pointer NEXT indicates that there is another flow of an image point which also passes through the same pixel (ix, iy) but at different depth z such as in the case of an image point on the backside of the same object or an image point of another object behind thereof. The pointer NEXT represents an address to be referred to for a further list of work data of such another image point. For example, as shown in FIG. 7, the list of work data for the pixel (ix, iy) includes work data on an object ObA, including a pointer NEXT which represents an address at which work data on another object ObB to which the pixel (ix, iy) also belongs is stored. If the pixel belongs to still another object ObC, then the address of its work data is indicated by the pointer of the work data stored at the above-said address. When there is no object to which the pixel belongs, NULL is written as the pointer. Furthermore, several different object points can be projected into the same pixel, in which case these data can be separately stored in the list. For instance, when a three-dimensional object Ob is traveling while rotating, the situation also arises where different image points of the object are at different pixel positions in a certain frame t but pass the same pixel $(ix_0, iy_0)$ in a frame $t_0$. At any rate, in the work data list for each pixel there are sequentially described the work data on the flows of different image points passing through the pixel while being associated with one another by the pointer. Thus, the work data forms a list structure by the pointer NEXT.

The contribution factor $\alpha$ is the ratio at which the RGB value of the respective object contributes to the color value (the RGB value) of the pixel when a plurality of flows overlap in the pixel. The contribution factor $\alpha$ is set to $0 \leq \alpha \leq 1$. In step 310 the initialization is made for all pixels (ix, iy) of the frame as follows:

$RGB_0(ix, iy)=0$ $z_0(ix, iy)=z_{max}$ $\alpha(ix, iy)=0$

NEXT(ix, iy)=NULL

The constant $z_{max}$ is the maximum value that is permissible as the depth value of an object; for example, in the case of an unsigned 24-bit integer, it is $2^{23}-1$. The constant NULL indicates the termination of the list structure. The work data for each pixel is stored at the corresponding address of a work data storage area.

Step 320 is a step of determining the filtering range $(t_1, t_2)$ which is specified by the frame number. For example, the length nt of a prespecified filtering range for the frame $t_0$ being currently processed is used to determine the filtering range as follows:

$t_1 = \text{MAX}(0, t_0 - nt/2)$ $t_2 = \text{MIN}(t_1 + nt - 1, t_{end})$

The symbols MAX and MIN represent the selection of maximum and minimum ones of the values provided in the brackets, respectively. Thereafter, steps 330 through 350 are repeated for the pixel (ix, iy) for all frames in the filtering range from $t_1$ to $t_2$.

Step 330 is a step of computing the motion, s, of object images in Eqs. (6) and (7), for instance. Typical examples of animation images to be synthesized on the screen are (a) an image of a moving rigid object, (b) an image of a moving non-rigid object, (c) an image of a mirror image of a moving object projected on a plane mirror, and (d) an image of a moving object through a refracting optical medium or reflected off a curved mirror. These images will be described below.

Figure 8A:
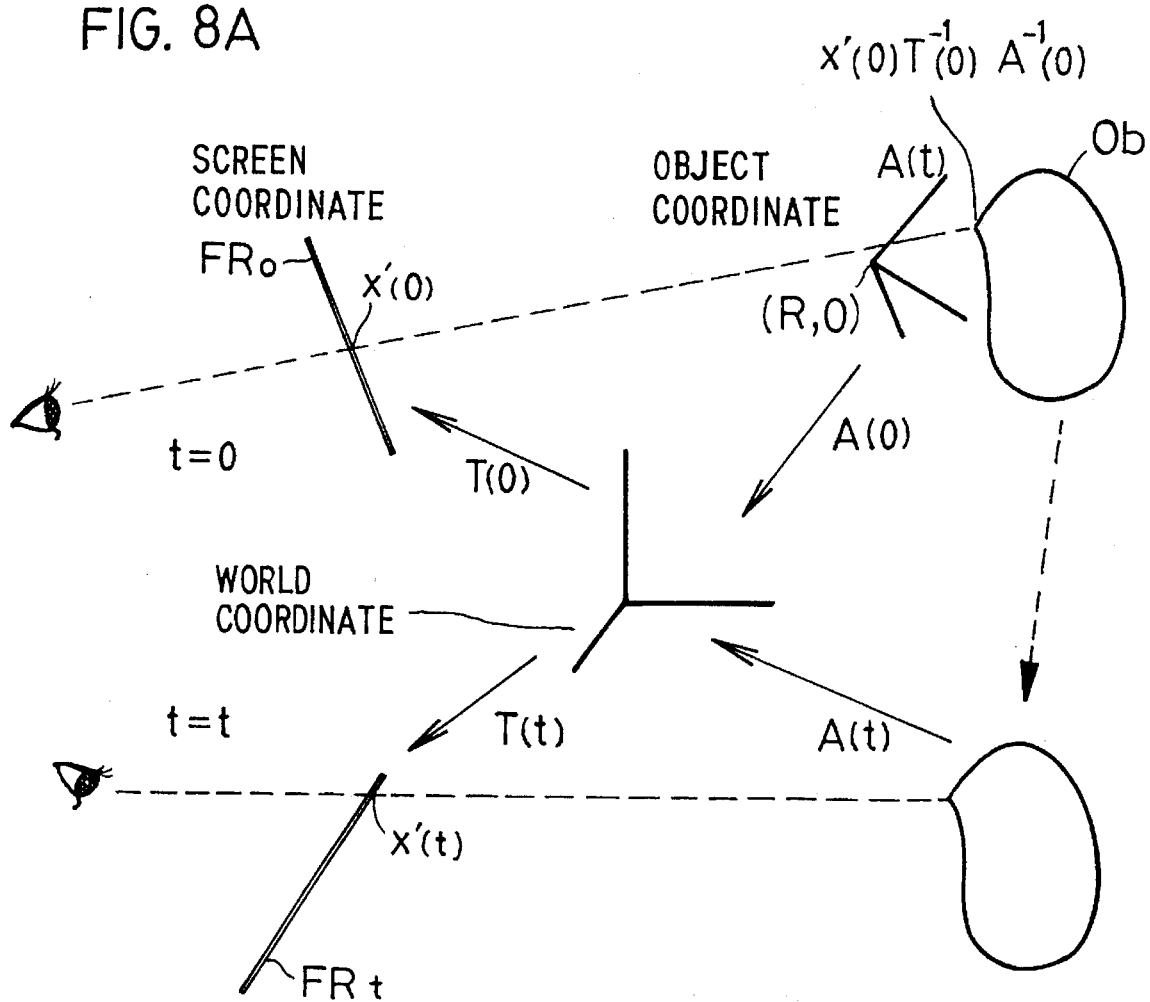
FIG. 8A is a diagram showing the relationships among a moving rigid body, the eye point and the image point.

(a) The position and attitude of the rigid object Ob are represented by the object coordinate system shown in FIG. 8A. This coordinate system can be described by a transformation matrix A which is derived from the world coordinate system. More specifically, a 3 by 3 rotation matrix R and the center position vector o are used to represent the object coordinate system by the following 4 by 4 matrix:

$$A = \begin{pmatrix} R & o \\ 0 & 1 \end{pmatrix}$$

On the other hand, an image point x' of a point x in the world coordinate system is computed by the following equation using a perspective transformation matrix T.

$$x' = xT$$

where x and x' are assumed to be described in terms of homogeneous coordinates. When the object Ob and the eye point PE are moving, both A and T are functions of time t. Hence, the image point projected to x'(t) at time t can be calculated by the following equation.

$$x'(t) = x'(0)T^{-1}(0)A^{-1}(0) A(t)T(t)$$

(b) In the case of the non-rigid object, assume that each point on the object is denoted by parametric function f(u, t) using a parameter u. Supposing that the point on the object corresponding to the parameter u is projected to the image point x'(0) at time t=0, this image point can be expressed by the following equation at time t.

$$x'(t) = f(u, t)T(t)$$

Figure 8B:
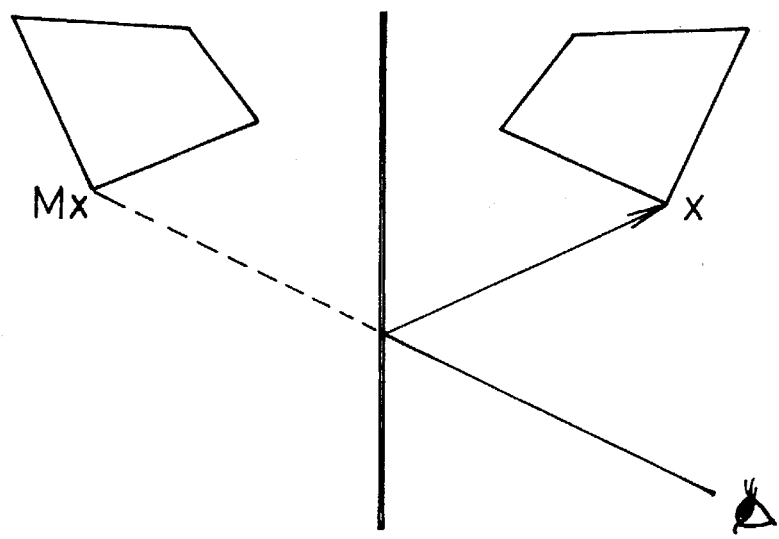
FIG. 8B is a diagram for explaining the movement of a planar mirror image.

(c) FIG. 8B shows the case of the motion of an image reflected off a plane mirror corresponding to the motion of an image. Assuming that the image is reflected by a plane defined by an equation ax+by+cz=d, the point of symmetry $x_m$ of the point x on the mirror surface to the plane can be computed from the following equation.

$$x_m = xM$$

$$M = \begin{pmatrix} 1+2a^2 & 2ab & 2ac & 0 \\ 2ab & 1+2b^2 & 2bc & 0 \\ 2ac & 2bc & 1+2c^2 & 0 \\ -2ad & -2bd & -2cd & 1 \end{pmatrix}$$

This mirror image point x' can be derived from the following equation using the perspective transformation matrix T.

$$x' = xMT$$

Figure 8C:
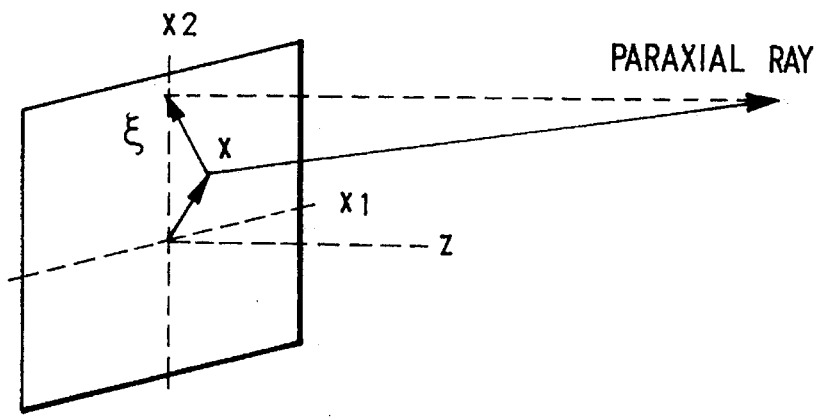
FIG. 8C is a diagram for explaining the movement of images refracted or reflected off curved surfaces.

(d) The paraxial approximation theory is known as the method of obtaining a reflected image by an ordinary curved surface or refracted image having passed through an optical medium. In this theory, a ray is specified in terms of position and direction. That is, a ray coordinate system as shown in FIG. 8C is considered and the ray is defined by the intersection (x) of the ray with the x-y plane and the projection (ξ) of the direction of the ray onto the x-y plane. When |x| and |ξ| are small, a change of the ray caused by reflection or refraction can be linearly approximated using the following matrix representation:

$$\begin{pmatrix} x_1 \\ \xi_1 \end{pmatrix} = \begin{pmatrix} A & B \\ C & D \end{pmatrix} \begin{pmatrix} X \\ \xi \end{pmatrix}$$

In the above, A, B, C and D are each a 2 by 2 matrix, which can be analytically or approximately obtained by a known method such as disclosed in, for example, Shinya, et al, "Principles and applications of pencil tracing," Proc. of Siggraph '87, pp. 45–54. For example, with respect to the ray from the eye point, the position x can be set 0 as expressed by the following equation, if the position of the eye point is set at the origin.

$$\begin{pmatrix} 0 \\ \xi_e \end{pmatrix}$$

Figure 8D:
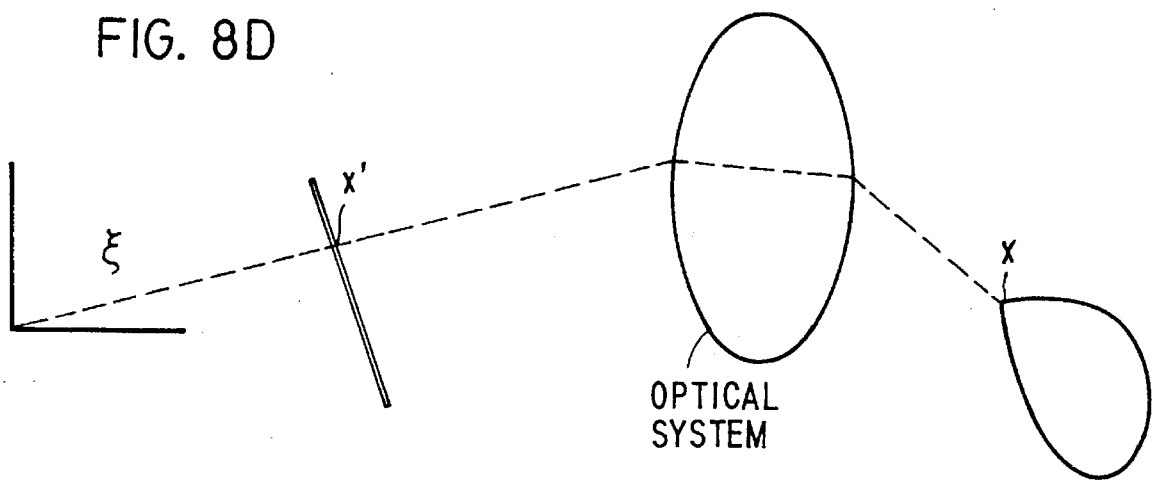
FIG. 8D is a diagram for explaining the approximation of the movement of a reflected or refracted image.

Assuming that this ray is reflected or refracted and reaches a point (x, z) on an object as shown in FIG. 8D, it can be expressed as a 2 by 2 matrix R given by the following equation.

$$R = (B+zD)^{-1}x$$

$$\xi_e = Rx$$

By linearly approximating the relationship between the eye direction $\xi_e$ and the image point x' on the screen and expressing it by the following equation using a matrix S $$x' = S\xi_e$$

the image point at the position x can be calculated as follows:

$$x' = SRx$$

In step 330 shown in FIG. 6, animation image data obtained when a moving object is observed under a desired condition is calculated by such methods as described above and is then output. Now, by way of example, the calculation of the motion, s, in Eqs. (6) and (7) is described with respect to the case where a rigid object moves. Eqs. (6) and (7), however, assumed the simplest motion of an object in the x-direction alone with a view to explaining the principles of the invention, but in the following description, to express the two-dimensional motion of the object, Eqs. (6) and (7) are rewritten as follows:

$$x_1 = s_x(t_1; x, y, t)$$

$$y_1 = s_y(t_1; x, y, t) \quad (14)$$

$$f(x, y, z) = f_0(s_x(t_1; y, t)), \quad (15)$$

$$s_y(t_1; y, t) \text{ if } t \in [-T/2, T/2]$$

$$= 0 \text{ otherwise}$$

The animation data and the data on the object identification number id are used to obtain the motion of each image point from the following equation.

$$(x_1, y_1, z_1, w_1) = (ix, iy, z(ix, iy, t_0), 1)$$

$$T^{-1}(id(ix, iy, t_o), t_0)$$

$$T(id(ix, iy, t_0), t)$$

$$s_x = INT(x_1/W_1)$$

$$s_y = INT(y_1/W_1)$$

$$z_1 = z_1/W_1 \quad (16)$$

In the above, $T^{-1}$ is an inverse matrix of the aforementioned perspective transformation matrix T and the function INT(a) is one that represents an integer closest to a real number a.

The determination step 340 checks if such a continuous motion as given by Eq. (15) is not obtained due to a hidden surface of the object Ob or its overlapping with another object, and in such a case, the next summation step 350 is skipped. This determination can be implemented by determining if the image point of the object sampled at the pixel (sx, sy) in the frame t, for instance, moves to the pixel (ix, iy) of the frame $t_0$ which is defined by Eq. (14). If the following equalities $$x_0' = ix$$

$$y_0' = iy$$

hold for $$(x, y, z, w) = (s_x, s_y, z(s_x, s_y, t), 1)$$
$$T^{-1}(id(s_x, s_y, t), t)$$
$$T(id(s_x, s_y, t), t_0)$$

$$z_0' = z/w$$

$$x_0' = INT(x/W)$$

$$y_0' = INT(y/W),$$

it is possible to make a determination that permits Eq. (15) to hold.

In step 350, a weighted summation, which is a discrete evaluation of Eq. (12) or (13) is performed when it is determined in step 340 that Eq. (15) holds. The weighted summation is made, for example, as follows:

$$RGB_0(ix, iy) = RGB_0(ix, iy) + RGB(s_x, s_y, t) \ast W$$

$$W_0 = W_0 + W$$

$$\alpha_0(ix, iy) = \alpha_0 + 1$$

$$id_0(ix, iy) = id(s_x, s_y) \text{ if } z_0' < z_0(ix, iy)$$
$$= id_0(ix, iy) \text{ otherwise}$$

$$z_0(ix, iy) = MIN\{z_0(ix, iy), z_0'\}$$

Figure 9:
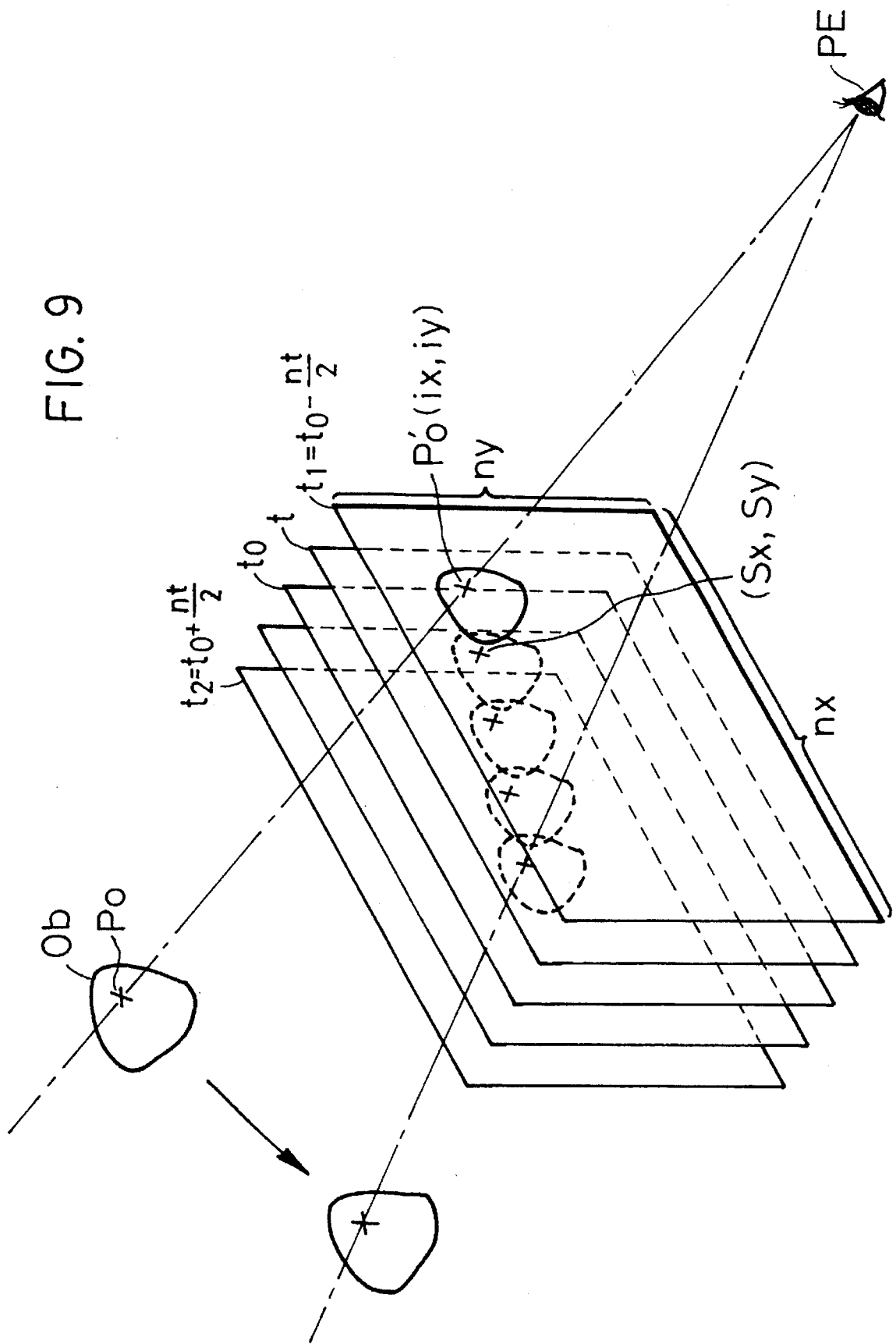
FIG. 9 is a diagram for explaining weighted summation of RGB values for the same image point.

The weighted summation for the RGB values from the frame $t_1$ to $t_2$ means that image points Po' on the frames $t_1$ through $t_2$, corresponding to the same point Po on the same moving object Ob are traced as shown in FIG. 9 and the weighted summation is made of RGB values of the pixels that the image point Po' follows. W is a weight function; if W=1 in the region of the pixel where the image point Po' on an arbitrary frame t lies and if W=0 outside the region, then the weight function becomes a box filter. Further, $z_0'$ is obtained in step 340. When it is determined in step 340 that Eq. (15) does not hold, step 350 is bypassed.

When steps 330 through 350 have been performed for all the frames in the filtering range from $t_1$ to $t_2$ in connection with the pixel (ix, iy), step 360 is performed. In step 360 the following normalization is conducted for the pixel (ix, iy).

$$RGB_0(ix, iy) = RGB_0(ix, iy)/W_0$$

$$\alpha_0(ix, iy) = \alpha_0(ix, iy)/(t_2 - t_1 + 1)$$

The normalized data $RGB_0$ and $\alpha_0$ are added, as work data of the pixel (ix, iy) of the frame $t_0$, to the data list of the address corresponding to the pixel.

Steps 330 through 360 mentioned above are performed for all pixels (ix, iy) of the frame $t_0$ being currently processed.

<Second Filtering>

Figure 10:
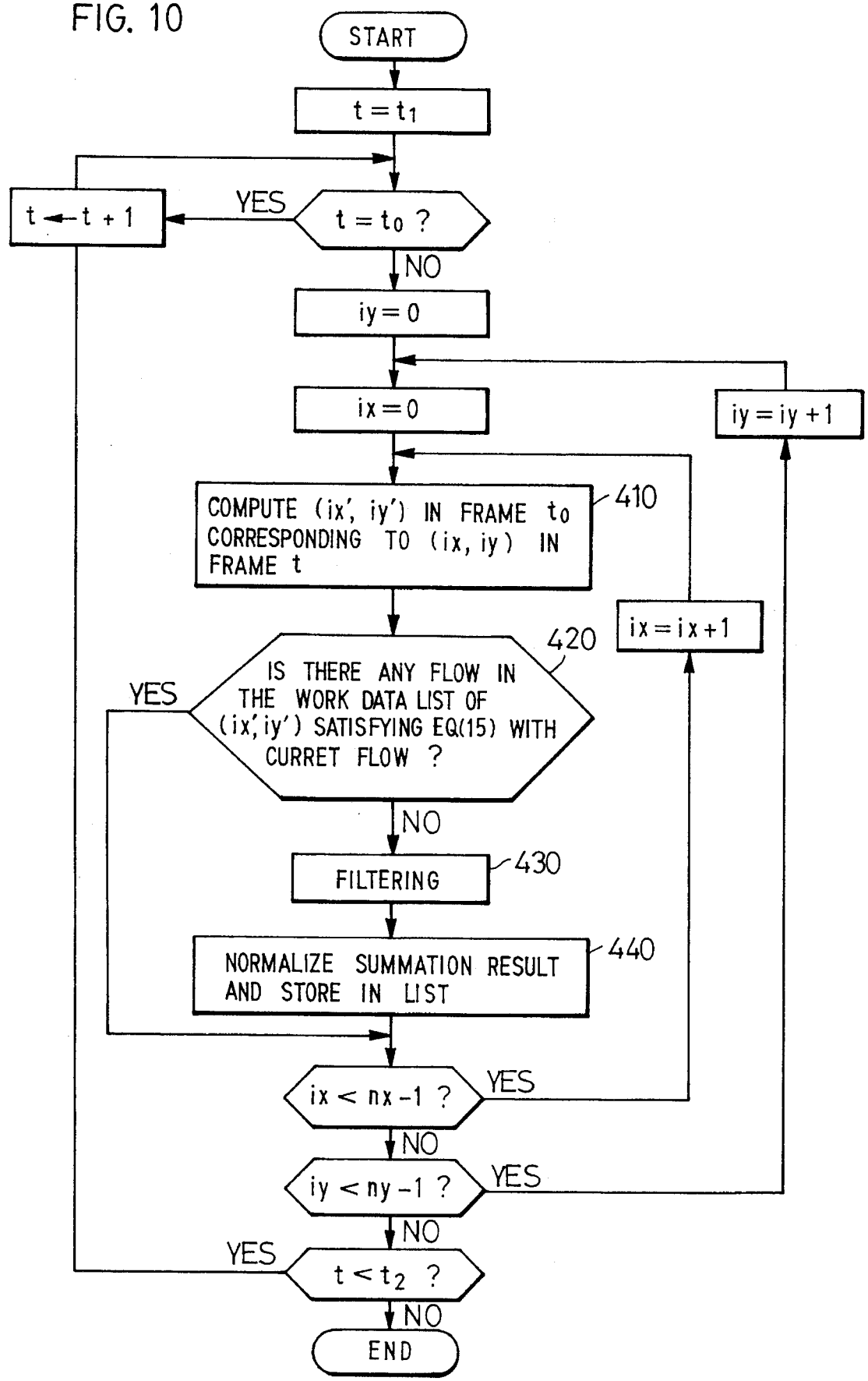
FIG. 10 is a detailed flowchart of a second filtering process in FIG. 3.

The second filtering step 40 in FIG. 3 is a step of performing spatio-temporal filtering for objects which could not be sampled in the frame $t_0$ being currently processed. The second filtering step is implemented by performing such processes as depicted in FIG. 10. In FIG. 10, variables $t_1$, $t_2$ indicate the range of filtering; variables ix, iy indicate the position of each pixel; constants nx, ny indicate the pixel resolution in the x- and y-directions, respectively; and a variable t indicates the frame number.

In the second filtering step, steps 410 through 440 are performed for all pixels in all frames t in the filtering range $t_1$ to $t_2$, except the frame $t_0$. Step 410 is a step of obtaining a pixel (ix', iy') in the frame $t_0$ to which the sampled image point at the pixel (ix, iy) in the frame t moves. As is the case with step 330 in FIG. 6, it is computed from the following equation:

$$(x_1, y_1, z_1, w_1) = (ix, iy, z(ix, iy, t), 1)$$
$$T^{-1}(id(ix, iy, t), t)$$
$$T(id(ix, iy, t), t_0)$$

$$x' = x_1/W_1$$

$$y' = y_1/W_1$$

$$ix' = INT(x')$$

$$iy' = INT(y') \quad (17)$$

Step 420 is a step of checking the data list stored in the work data memory for the pixel (ix', iy') of the frame $t_0$ and determining if the list contains values which satisfies the relationship between the pixel (ix, iy) in the frame t and Eq. (15). Processing similar to that of step 340 in FIG. 6 is carried out for all pairs of z value $z_j$ and object identification number $id_j$ held in the list. That is, the motion of the image point for the same object $id_j$ is derived from the following equation $$(x, y, z, w) = (ix', iy', z_j, 1)T^{-1}(id_j, t_0) T(id_j, t)$$

$$x_j' = x/W$$

$$y_j' = y/W$$

to make a check to see if the following inequalities hold.

$$|x_j' - ix| < 0.5$$

$$|y_j' - iy| < 0.5 \quad (18)$$

If the pair of data $z_j$ and $id_j$ for which the equality holds is not found, then it is construed that the image point sampled at the pixel (ix, iy) in the frame t existed at the pixel (ix', iy') in the frame $t_0$ but has not been processed yet, for example, because it was in the shadow of another object image; then, filtering is performed for this sample in step 430. When the pair of data $z_j$ and $id_j$ satisfies the inequalities (18), its object image has been already subjected to the first filtering; accordingly, steps 430, 440 and 450 are skipped.

The filtering step 430 is the same as the steps 330, 340 and 350 in the first filtering step and is performed as mentioned below. At first, the following computation is conducted for the frame t' in the filtering range.

$$(x_1, y_1, z_1, w_1) = (ix, iy, z(ix, iy, t), 1)$$
$$T^{-1}(id(ix, iy, t), t)$$
$$T(id(ix, iy, t), t)$$

$$x_1' = x_1/W_1 + (ix' - x')$$

$y_1' = y_1/W_1 + (iu'-y')$ $s_x = \text{INT}(x_1')$ $s = \text{INT}(y_1')$ $z_1 = z_1/W_1$ In the above, ix', iy', x' and y' are those obtained by Eq. (17) in step 410 and t is the one in FIG. 10. Then, it is determined if the following equations $x_0' = ix'$ $y_0' = iy'$ hold for $(x, y, z, w) = (s_x, s_y, z(s_x, s_y, t'), 1)$ $T^{-1}(id(s_x, s_y, t'), t')$ $T(id(s_x, s_y, t'), t_0)$ $z_0' = z/W$ $x_0' = \text{INT}(x/W)$ $y_0' = \text{INT}(y/W).$ When it is determined that they hold, the following weighted summation, which is a discrete evaluation of Eq. (14), is computed.

$RGB_a = RGB_a + RGB(s_x, s_y, t')*W$ $\alpha_a = \alpha_a + 1$ $id_a = id(s_x, s_y)$ if $z_0' < z_a$ $\quad = id_a$ otherwise $z_a = \text{MIN}(z_0', z_a)$ Step 440 is a step wherein $RGB_a$, $id_a$ and $z_a$ computed in step 430 are normalized as in step 360 in FIG. 6 and then added on the work data list corresponding to the pixel (ix', iy').

<Output Image Determination>

Figure 11:
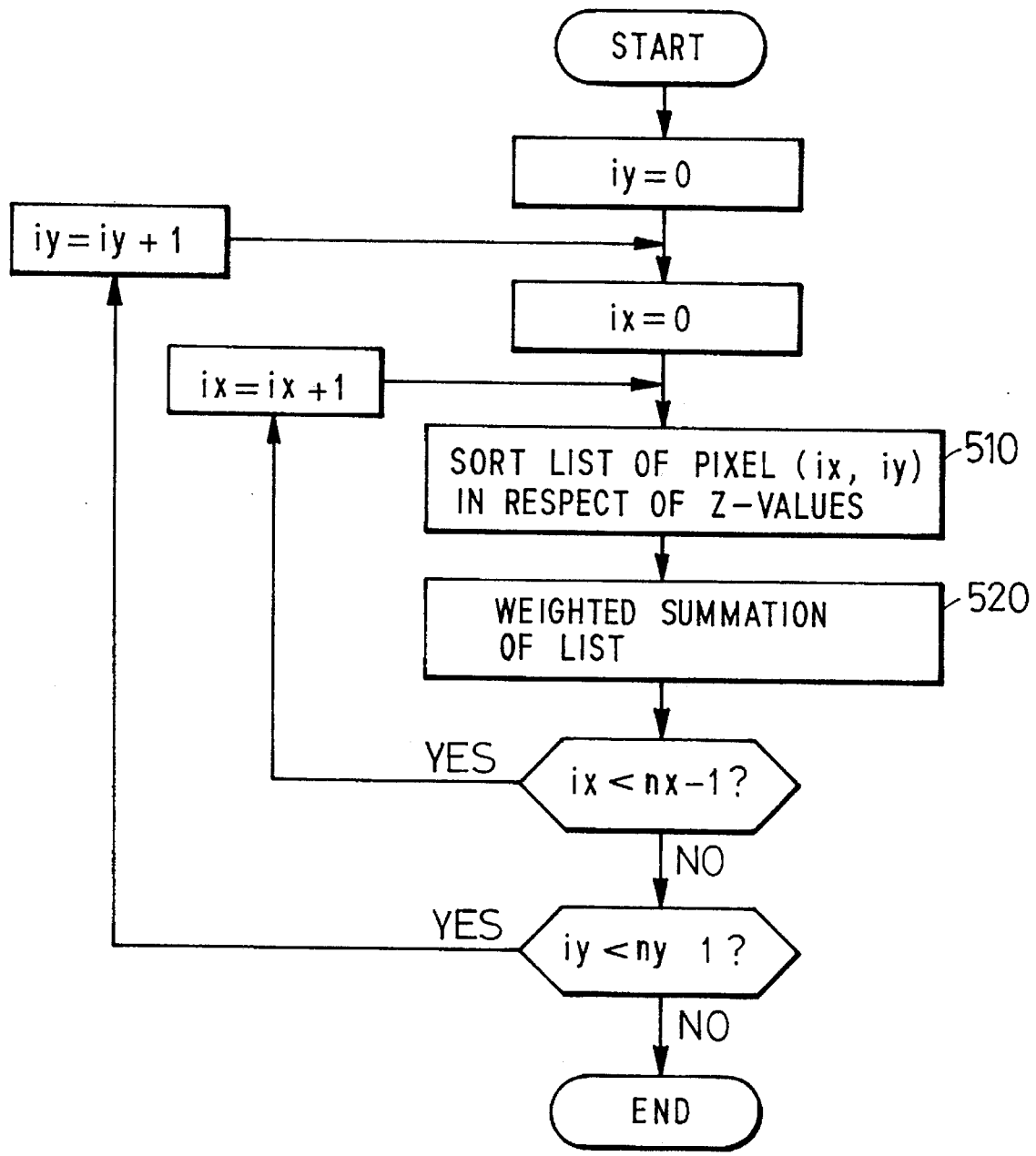
FIG. 11 is a detailed flowchart of an output image determination process in FIG. 3.

The output image determination step 50 in FIG. 3 is to determine the output image of the currently processed frame $t_0$ on the basis of the results obtained by the first and second filtering. This step is implemented by performing such processes as depicted in FIG. 11.

Step 510 is a step wherein data such as $RGB_j$ and $\alpha_j$ stored in the list of the work data corresponding to the pixel (ix, iy) are sorted for the depth value z for that pixel. Let it be assumed, for instance, that the following three sets of data have been stored as the list for a certain pixel.

$(RGB_1\ z_1\ \alpha_1\ id_1\ \text{NEXT})$, $(RGB_2\ z_2\ \alpha_2\ id_2\ \text{NEXT})$, $(RGB_3\ z_3\ \alpha_3\ id_3\ \text{NULL})$ In this example, if $z_2 < z_3 < z_1$, the three sets of data are rearranged in ascending order of the value z by sorting as shown below.

$(RGB_2\ z_2\ \alpha_2\ id_2\ \text{NEXT})$, $(RGB_3\ z_3\ \alpha_3\ id_3\ \text{NEXT})$, $(RGB_1\ z_1\ \alpha_1\ id_1\ \text{NULL})$ Step 520 is a step wherein the lists arranged in increasing order of the value z (i.e. in increasing order of the distance of image points on the same object and/or different objects from the eye point), obtained in step 510, are subjected to a weighted summation based on the contribution factor. This summation is calculated by $RGB = \alpha_{i1}*RGB_{i1} + (1-\alpha_{i1})*\alpha_{i2}*RGB_{i2} + (1-\alpha_{i1})*(1-\alpha_{i2})*\alpha_{i3}*RGB_{i3}$ In the above-mentioned example of the lists, $RGB = \alpha_2*RGB_2 + (1-\alpha_2)*\alpha_3 RGB_3 + (1-\alpha_2)*(1-\alpha_3)*\alpha_1*RGB_1$ By performing the processing of steps 510 and 520 for all the pixels, an output image for the frame $t_0$ is synthesized.

By performing steps 30 through 50 in FIG. 3 for all frames, the processing is completed and anti-aliased animation images are obtained.

Figure 12C:
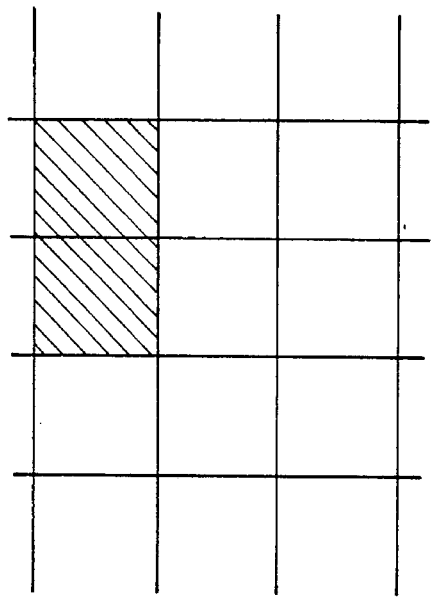
FIGS. 12A through 12D are diagrams showing, by way of example, the effect of the present invention.
Figure 12D:
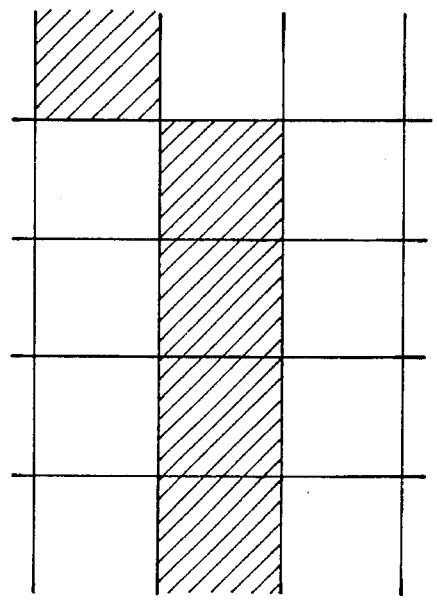
Figure 12A:
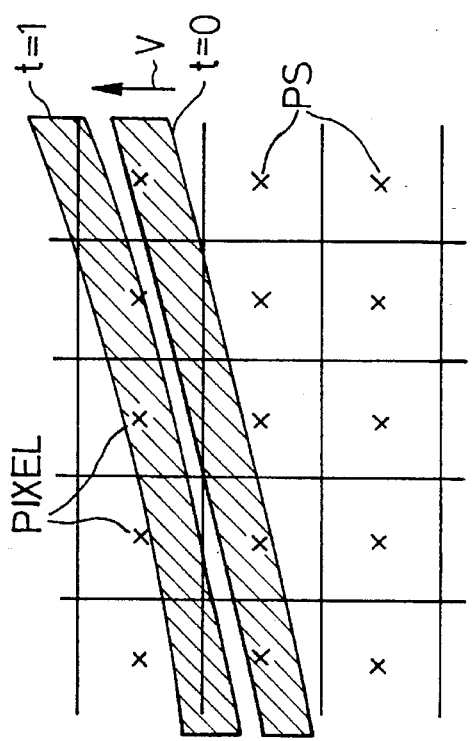
Figure 12B:
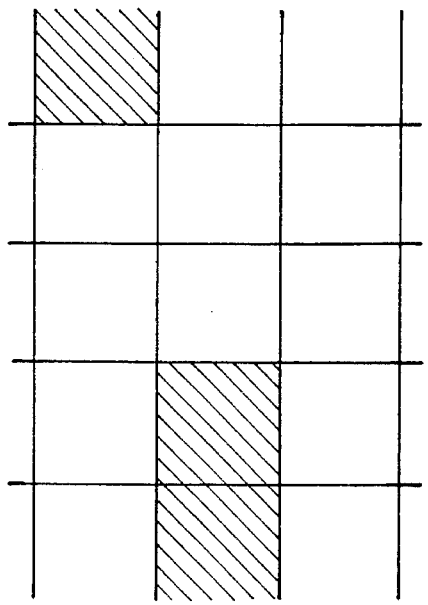

FIGS. 12A through 12D schematically illustrate the operation of the present invention. Now, suppose that an image of a narrow rectangular object has moved by V pixel in the elapse of time from t=0 to t=1 as shown in FIG. 12A. Since the projected image is narrow, some points on the image are left unsampled; consequently, an image that ought to be continuous becomes a discontinuous image at time t=0 as shown in FIG. 12B and at time t=1 as shown in FIG. 12C. This is also aliasing. The conventional super-sampling method is used to reduce such aliasing by increasing the number of samples per pixel; the computing time increases in proportion to the number of samples. In contrast thereto, according to the present invention, by applying spatio-temporal filtering to images at t=0 and t=1 taking into account the motion V, such a continuous image as shown in FIG. 12D can be provided despite use of only one sample point per pixel.

As described above, according to the present invention, since animation images are subjected to spatio-temporal filtering for anti-aliasing, it is possible to achieve anti-aliasing comparable to that achieved by the conventional super-sampling method at higher speed without the necessity of increasing the number of samples. Moreover, since each pixel value is determined on the basis of the depth value z as in the output image determination step in FIG. 11 after making a check to see if Eq. (15) is satisfied as in step 340 in FIG. 6 and in step 420 in FIG. 10, the correct operation is performed even if an image point on the object is hidden behind other objects.

By shifting the position of the sample point relative to the pixel center for each frame in the animation image synthesizing step, anti-aliasing can be achieved for objects which stand still with respect to the screen coordinate system, for instance. In this instance, the image of these objects would not move unless the sample point is displaced. This is proved by the fact that by extending Eq. (10) to a two-dimensional form and substituting s=0 (i.e $s_x = s_y = 0$) thereinto, $h_{m,n,l} = f_0(x_0, y_0) K_{m,n,l}(l\Omega)$ $\quad = f_0(x_0, y_0) \exp(il\Omega) dt$ $\quad = (1/2\pi) f_0(x_0, y_0) \delta(l\Omega)$ is obtained which diverges at l=0. On the other hand, when the sample point is displaced for each frame, the image delicately moves on the screen and Eq. (15) does not diverge, permitting anti-aliasing.

It will be apparent that many modifications and variations may be effected without departing from the scope of the novel concepts of the present invention.

What is claimed is:

1. A method for eliminating aliasing which occurs in a time-series sequence of frames of images of an animation synthesized by sampling on a computer, said method comprising the steps of:

(1) synthesizing a time-series sequence of frames of images of an animation by sampling at sample points on an object seen from an eye point for each frame;

(2) computing a motion $s(t;x_0,t_0)$ of each of image points at time t on a screen corresponding to one of the sample points on the object through utilization of the motion of said object and the eye point used in the synthesis of said animation, said motion $s(t;x_0,t_0)$ representing the position of each image point at time t whose position was $x_0$ at time $t_0$;

(3) computing a kernel $g(x,t;x_0,t_0)$ of a linear spatio-temporal filtering by the following equation $$g(x,t;x_0,t_0)=Cw(x_0-s(t_0;x,t))\partial s/\partial x$$

where C denotes a normalization constant, w(x) denotes a spatial anti-aliasing filter; and (4) subjecting each image f(x,t) of animation to spatio-temporal filtering by calculating the following equation $$\iint f(x,t)g(x,t;x_0,t_0)dxdy$$

whereby spatial aliasing in the image f(x,t) of animation is eliminated.

2. The method of claim 1, wherein said spatio-temporal filtering includes a first filtering step wherein, for each of a series of frames within a predetermined range of a number of frames, spatio-temporal filtering is performed in accordance with the motion of said image point computed for an image point of a sampled object image in each frame.

3. The method of claim 2, wherein said spatio-temporal filtering includes a second filtering step of per/brining filtering for unsampled image points of the object not seen from said eye point.

4. The method of claim 3, wherein said second filtering step includes a step of calculating the path of an image point of said object which was not sampled in a frame t and performing a weighted summation of color values of pixels of respective frames, except said frame t, while tracing the calculated path.

5. The method of claim 2 or 3, wherein said first filtering step includes a step of sequentially conducting a weighted summation of color values of pixels tracing paths of sampled image points of said series of frames on the basis of said computed motion.

6. The method of claim 1, further including a step of displacing, in the synthesis of said animation images by said sampling, the position of each of the sample points for each of said frames of said animation images and subjecting the resulting images of animation to said spatio-temporal filtering.

7. The method of claim 1, wherein said step of computing the motion of each image point comprises a step of computing the motion of said image point by the following equation $$x'(t)= x(0)T^{-1}(0) A(t)T(t)$$

where T(t) denotes a perspective transformation matrix and A denotes a transformation matrix expressed by $$A = \begin{pmatrix} R & o \\ 0 & 1 \end{pmatrix}$$

R being a rotation matrix representing an attitude of the object, o being the center position vector of the object.

8. The method of claim 1, wherein said object is a non-rigid object and said step of computing the motion of an image point comprises a step of computing the motion of an image point of said non-rigid object by x'(t)=f(u,t)T(t) using a parametric function f(u,t) representing each point on said non-rigid object at time t and a perspective transformation matrix T(t), where u is a parameter corresponding to the point on said object.

9. The method of claim 1, 6, 7 or 8, wherein said step of computing the motion of said image point is a step of computing, as said image point on the screen, a mirror image of a point on said object reflected by a simulated plane mirror on the basis of a symmetrical transformation.

10. The method of claim 1, 6, 7 or 8, wherein said step of computing the motion of an image point comprises a step of computing, as the motion of said image point on the screen, the motion of a mirror image of a point on said objected reflected by a simulated curved surface on the basis of the paraxial approximation theory.

11. The method of claim 1, 6, 7 or 8, wherein said step of computing the motion of an image point comprises a step of computing, as the motion of said image point on said screen, the motion of an image of a point on a reflected image of said object having passed through a simulated optically transmissive medium based on the paraxial approximation theory.

* * * * *